Figure 9:
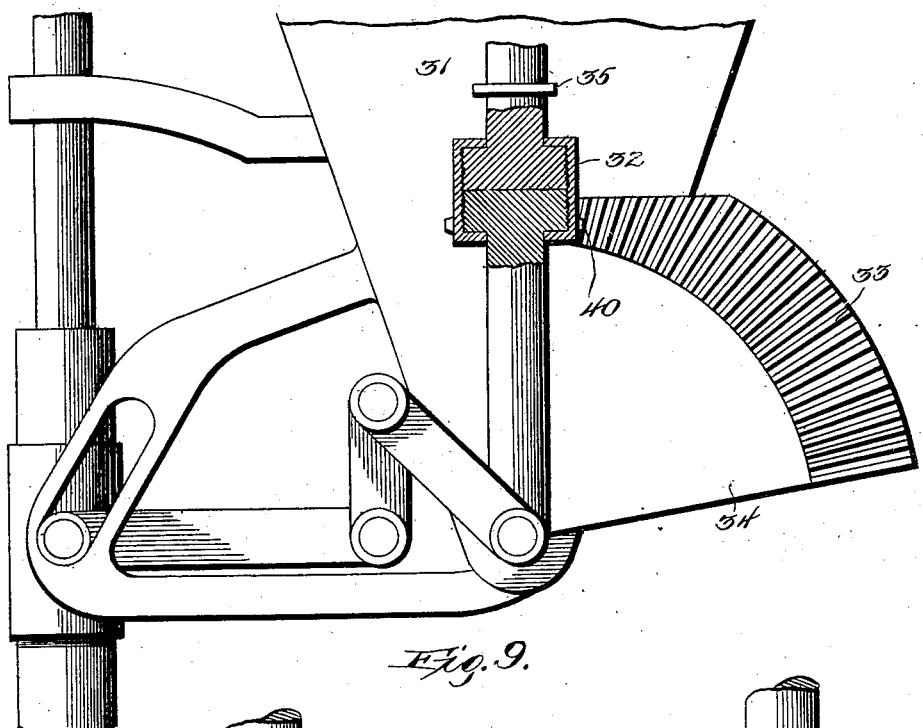

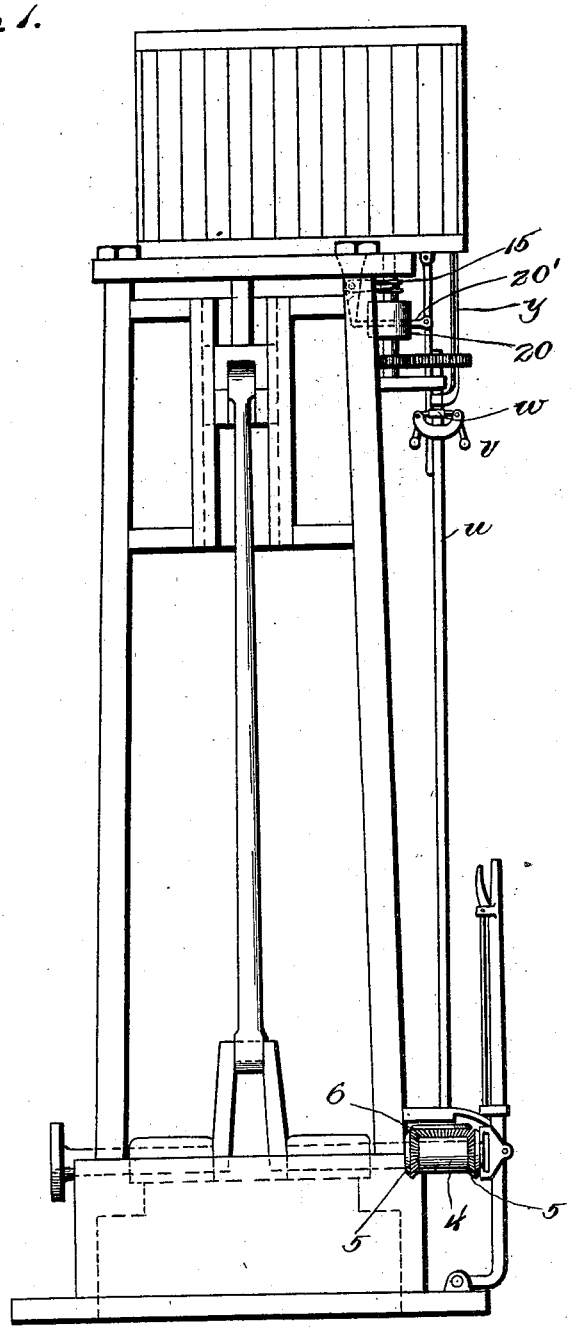

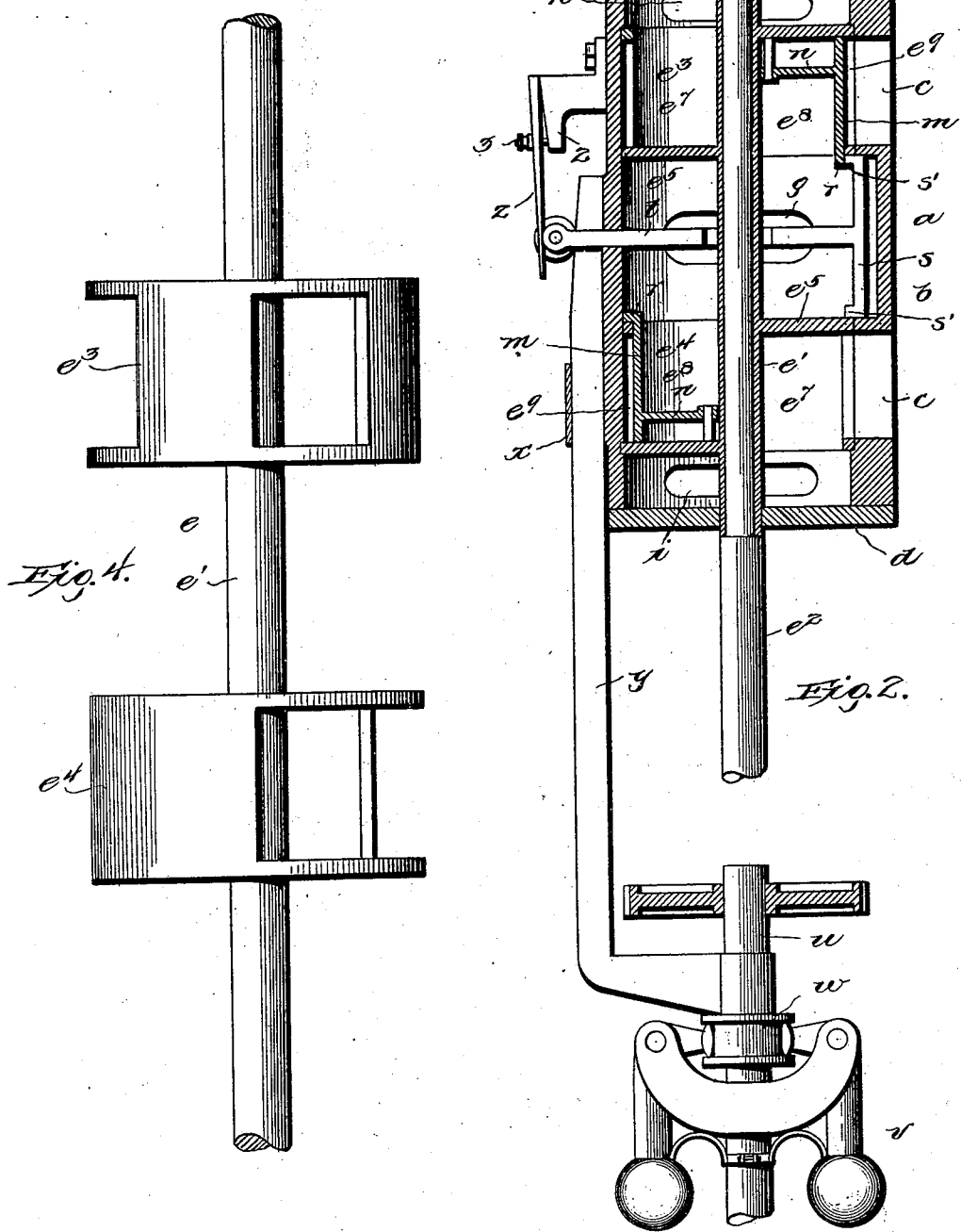

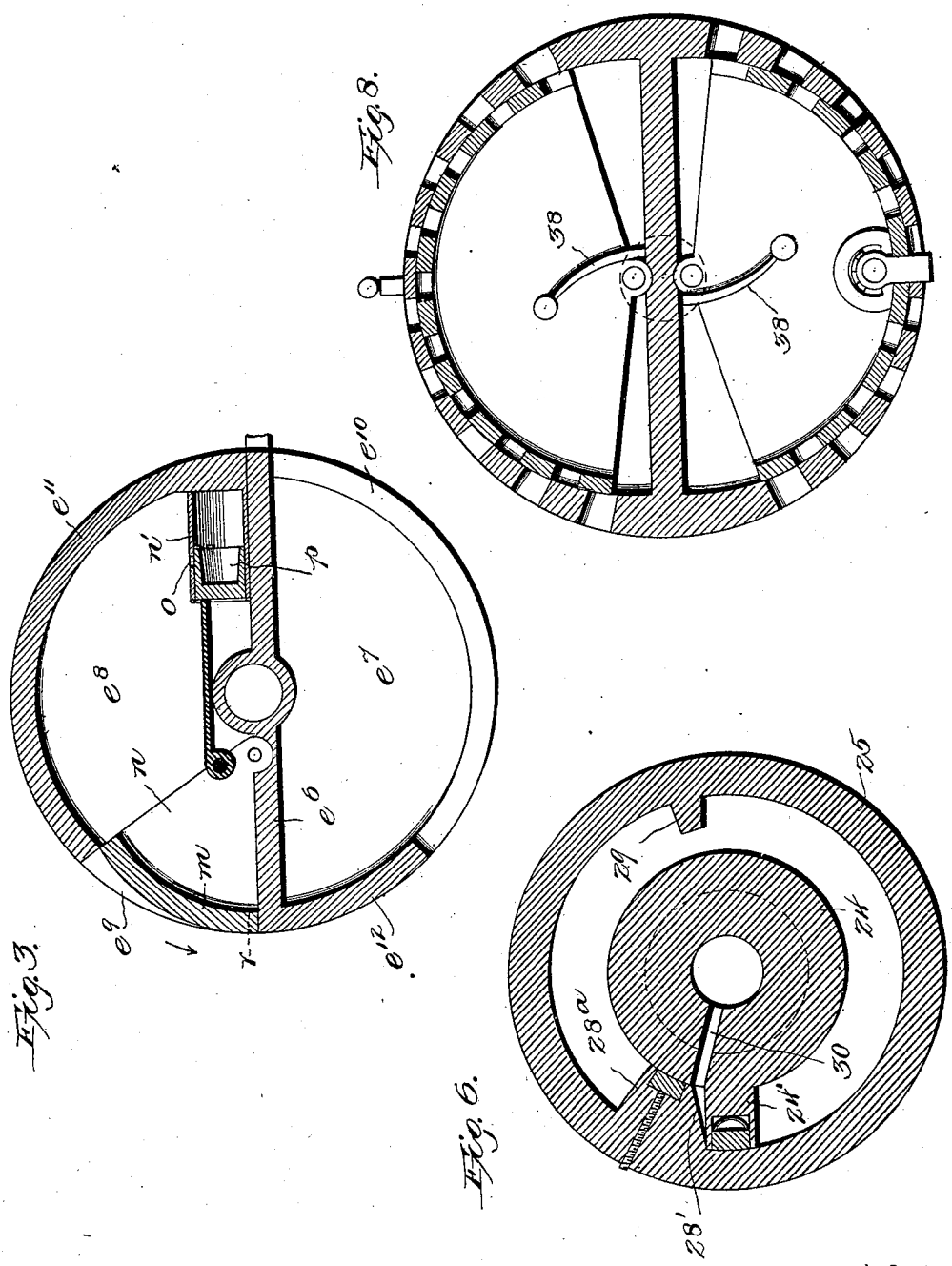

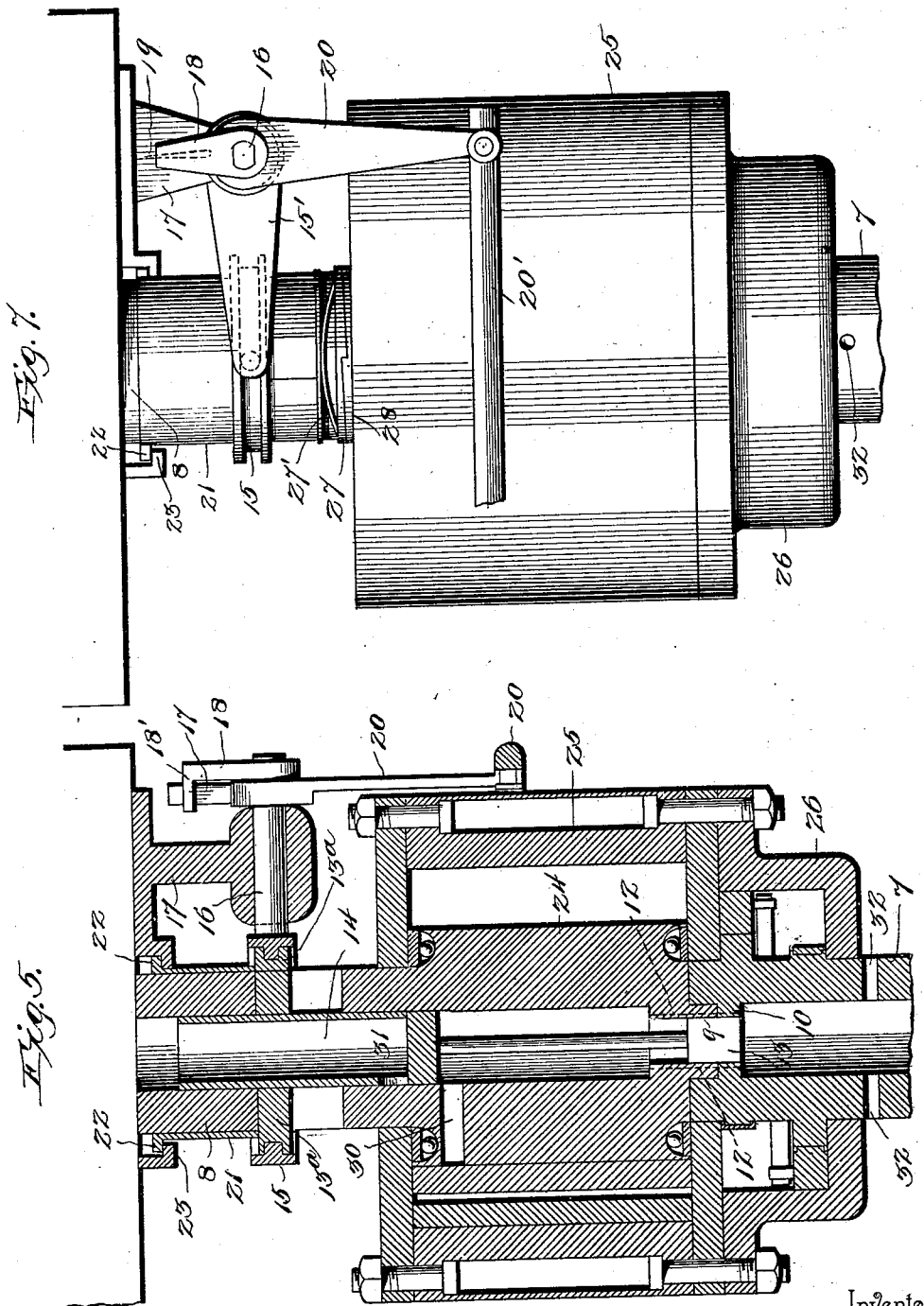

No. 728,838. PATENTED MAY 26, 1903.
P. B. BELCHES.
STEAM ENGINE VALVE.
APPLICATION FILED JUNE 2, 1902.
NO MODEL. 6 SHEETS—SHEET 5.

Witnesses
Inventor
Peter Berkeley Belcher
his Attorneys

No. 728,838. PATENTED MAY 26, 1903.
P. B. BELCHES.
STEAM ENGINE VALVE.
APPLICATION FILED JUNE 2, 1902.
NO MODEL. 6 SHEETS—SHEET 6.
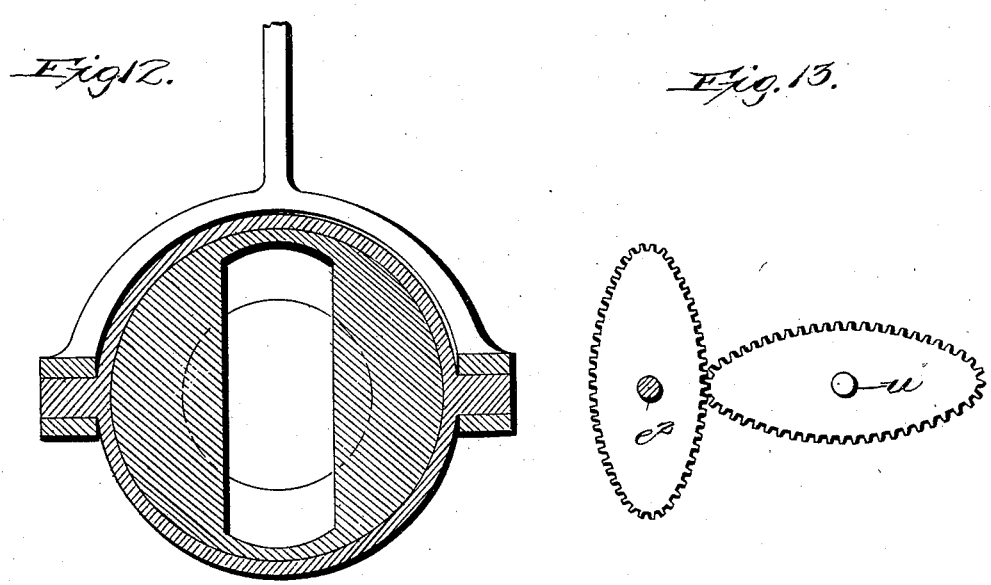
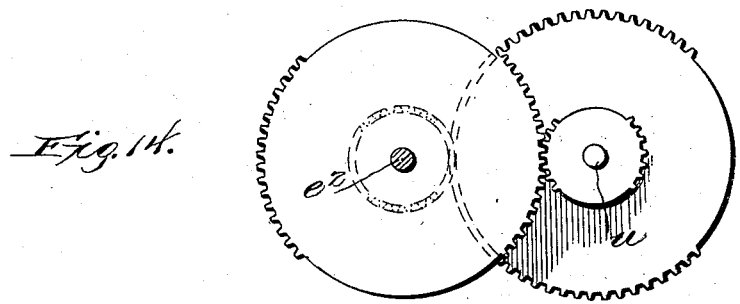
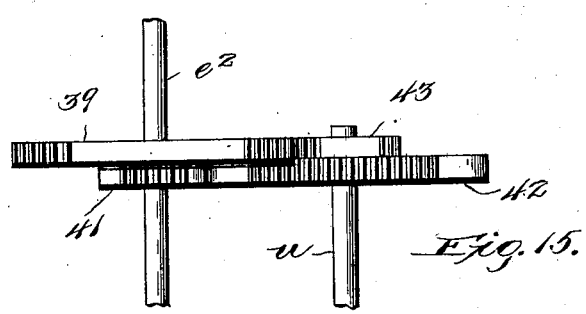
Witnesses
Inventor
Peter Berkeley Belcher
By Church & Church
his Attorneys No. 728,838. Patented May 26, 1903.

UNITED STATES PATENT OFFICE.

PETER BERKELEY BELCHES, OF HAYMARKET, VIRGINIA.

STEAM-ENGINE VALVE.

SPECIFICATION forming part of Letters Patent No. 728,838, dated May 26, 1903.

Application filed June 2, 1902. Serial No. 109,997. (No model.)

*To all whom it may concern:*

Be it known that I, PETER BERKELEY BELCHES, a citizen of the United States, residing at Haymarket, in the county of Prince William, State of Virginia, have invented certain new and useful Improvements in Steam-Engine Valves; and I do hereby declare the following to be a full, clear, and exact description of the same, reference being had to the accompanying drawings, forming a part of this specification, and to the figures and letters of reference marked thereon.

My invention relates to an improvement in steam-engine-valve mechanism of the rotary-valve type designed to afford a more perfect steam distribution than is now attained in engine-valve mechanisms of this character, to avoid as far as practicable the use of packing, to reduce the friction incident to the operation of such mechanism, provide for a close regulation and positive governing of the steam-supply, and to generally simplify and increase the effectiveness of valves of the kind referred to.

A further purpose of the invention is to provide simple and effective reversing mechanism particularly adapted for rotating valves having continuous travel in the same direction during the forward and reverse driving or rotation of the crank-shaft of the engine.

With these objects in view and such others as will suggest themselves when the construction, operation, and effect of the invention is understood the same contemplates the provision of a rotary valve to be associated with an engine-cylinder having inlet-ports leading into the opposite ends of the same, the valve being provided with a steam-port having means combined with the same for regulating the area thereof.

The invention further includes a controller for said regulating means and an automatically-operating governor for said controller.

It further includes a valve having a head associated with each steam-port in the cylinder, said heads being divided into separate independent sides or compartments, one of which forms the admission side of the same, while the other forms the exhaust side thereof.

It also includes auxiliary means for imparting to the valve a part of a complete revolution independently of the ordinary means for rotating the same to provide for the reversing of the crank-shaft of the engine.

It also includes means for preventing the operation of said auxiliary mechanism when the valve occupies a certain predetermined position, and it further includes the various details of construction and combination of elements, as will be hereinafter described, and particularly pointed out in the claims.

While the present invention is susceptible of many embodiments in which the details of construction may be varied within a wide range without departing from the spirit of the invention, I have illustrated in the accompanying drawings and will hereinafter describe in connection therewith what I now conceive to be a preferred embodiment of the same, together with some modifications thereof.

Figure 10:
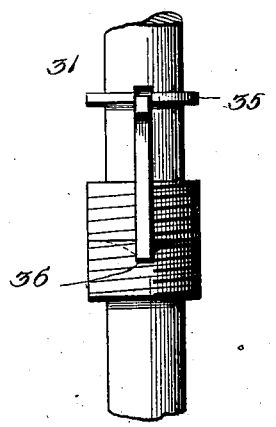
Figure 11:
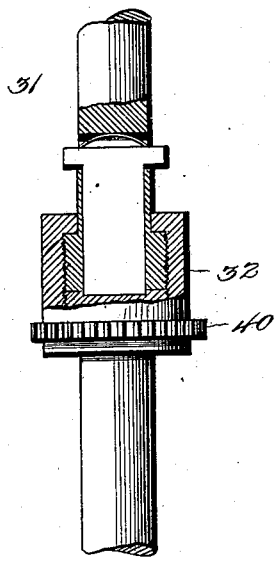

In the drawings, Figure 1 shows an engine embodying my invention in side elevation. Fig. 2 is a detailed longitudinal sectional view of the preferred form of valve. Fig. 3 is a transverse sectional view of the same. Fig. 4 is a side elevation thereof. Fig. 5 is a longitudinal sectional view of the preferred form of mechanism for giving the valve an auxiliary movement. Fig. 6 is a detailed transverse sectional view of the same. Fig. 7 is a side elevation thereof. Fig. 8 is a transverse sectional view of a modified construction of valve. Fig. 9 is a detailed elevation of a modified construction of means for giving the valve an auxiliary movement. Fig. 10 is a detailed view of part of this mechanism, a portion being broken away. Fig. 11 is a detailed view of the same. Fig. 12 is another detailed view of a part of this mechanism. Fig. 13 is a detailed view of one arrangement for driving the valve at different relative speeds. Figs. 14 and 15 show a modification of the same.

In the accompanying drawings the engine-cylinder with which the improved valve is associated is indicated by the letter $a$, having a reciprocating piston $b$ and steam-port $c$, leading through the shell thereof near each end of the same. The valve-chamber $d$, in which the valve $e$ works, is preferably cylindrical in form and is provided with a centrally-located inlet-port $g$ and with exhaust-ports $h\,i$, arranged at the ends thereof. The valve proper, $e$, comprises an elongated sleeve $e'$, fitted to the reduced end of the valve-stem $e^2$, provided with two cylindrical heads $e^3$ $e^4$, accurately fitted to the chamber $d$, one of said heads being associated with each port $c$ to control the same. As indicated, the bore of the casing forming the chamber $d$ is provided with an annular shoulder near each end thereof, which present bearings for the end of the heads $e^3$ $e^4$ to accurately center the same and prevent the valve from shifting axially.

Each head comprises a cylindrical shell partitioned by a centrally-arranged diaphragm or wall $e^6$, which divides the same into two compartments or sides of equal size to provide separate admission and exhaust passages in each head. Each compartment or side is completely closed at one end by a wall or head $e^5$, while the opposite end is left entirely open, and, as will be noted on reference to the accompanying drawings, the walls $e^5$ in each head are arranged in diametrically opposite positions, the end wall of the exhaust side $e^7$ of each head separating the same from the inlet-port $g$, while the end wall of the admission side $e^6$ separates the latter from the exhaust-port in the casing $d$, located in proximity thereto, while the open end of each admission side is in open communication with the inlet-port and the open end of each exhaust side is in open communication with the adjacent exhaust-port.

In the operation of the engine the live steam enters the valve-chamber $d$ through the admission-port $g$ and passes unobstructedly into the admission side of each of the heads through the open ends of the same and discharges therefrom through peripheral ports $e^9$, which register with the ports $c$ during the rotation of the valve. The steam exhausted from the cylinder discharges through the respective ports $c$ and through the elongated peripheral ports provided in the heads $e^3$ $e^4$ associated therewith, said ports being located on the exhaust side of said heads. The exhaust-steam then passes out of the open ends of said exhaust sides into and through the respective exhaust-ports $h$ $i$. It will be understood that one of the heads $e^3$ $e^4$ controls the admission and exhaust to one end of the cylinder $a$, while the other head performs a like office for the opposite end of the cylinder and that said heads are so relatively arranged that when the admission-port $e^9$ of one head is in register with one of the ports $c$ the exhaust-port $e^{10}$ of the other head is in register with the other port $c$.

Upon reference to Fig. 3 it will be seen that each admission-port $e^9$ extends around or occupies approximately one-fourth of the periphery or shell of the admission side of its heads, while the remaining portion thereof is left intact or solid. On the exhaust side the conditions are reversed, the admission-ports occupying approximately three-fourths of the peripheries or shells of the exhaust sides of the heads, leaving but one-fourth thereof solid or intact. In operation the valve rotates in the direction indicated by the arrow shown in Fig. 3, and as each of the heads $e^3$ $e^4$ performs a similar function with a like effect I will describe the operation of but one of the same. When the port $e^9$ of one of the heads registers with its port $c$, assuming that the former is unobstructed, the steam passes into the cylinder $a$ until the rear edge of said port $e^9$ passes out of register with the port $c$, and then the solid part $e^{11}$ of the head closes the port $c$ and maintains the same closed during the expansion of the live steam which has just been admitted into the cylinder. In the continued rotation of the head the port $e^{10}$ is brought into register with the port $c$, and the steam then exhausts from the cylinder until said port $e^{10}$ passes the port $c$ and the solid portion $e^{12}$ comes opposite to and closes said port $c$, and then a slight compression takes place in the cylinder previous to the admission of live steam, which occurs again as soon as the leading edge of the port $e^9$ comes into register with said port $c$.

It is desirable in the practical operation of an engine to be able to regulate the supply of live steam to the cylinder, and for this purpose in the present invention a gate $m$ is associated with the admission-port $e^9$, which is segmental in contour and of sufficient size to completely close the port with which it is associated. Each gate $m$, which is located within the admission side of each head and finds a bearing upon the inside of the shell or periphery thereof along the edge of the port $e^9$, is pivotally supported by an arm $n$, pivoted to the wall $e^6$ adjacent to but eccentrical of the valve-stem, and to close and normally maintain the gate in closed position tension means are associated therewith. As shown in Fig. 3, this means comprises a cylinder $n'$, arranged within the admission side of the head parallel to the wall $e^6$, having a steam-inlet opening $o$ in the shell thereof, and in this cylinder a piston $p$ works, which has a pitman connection to the arm $n$, engaging with the latter above the pivotal point thereof. The pitman, as shown herein, is made flexible to permit of the yielding thereof when the gate is opened, this construction of the pitman avoiding the necessity of pivotally connecting the same at its ends. Each gate is provided with an inwardly-extending lateral stud $r$, arranged coincident with the leading edge thereof, and an element is provided, held against rotation, which projects into the path thereof to counteract with the same in the rotation of the valve and temporarily arrests the rotation of the gate in unison with said valve. When the gate is thus arrested, as the head continues its rotation the former is opened or forced back against the resistance of the tension means, before referred to, which opens the port with which the gate is associated to a greater or less extent. The extent of this opening is controlled entirely by the position of the element which extends into the path of the stud $r$. As disclosed in the accompanying drawings, this element comprises a bar $s$, guided and held upon a shelf projecting radially from the inner wall of the chamber $d$ outside of the plane of the peripheries of heads $e^3$ $e^4$, said bar being provided at its opposite ends with inwardly-extending projections $s'$, designed to be shifted into the path of the lugs $r$. To shift the bar, a stem $t$ is provided therefor, which extends across the casing $d$ and projects through the outer wall of the same into position to be manipulated. By shifting this stem the positions of the projections $s'$ may be regulated.

When the gates are closed, the studs $r$, carried thereby, lie in a plane substantially coincident with the periphery of the heads, and if the ends $s'$ are projected so as to intersect this plane they will lie in the paths in which said lugs travel when the gates are in closed positions. By reason of the eccentricity of the pivotal points of said gates as the latter open they will recede into the heads and the distances between the centers of said heads and the lugs $r$ consequently diminished. It will thus be apparent that as the gates open the lugs $r$ will gradually move toward the ends of the projection $s'$, and if the latter project inwardly comparatively a short distance said lugs will slip over the ends of the same after a slight opening of the gates, and thus free the latter when the steam which has been compressed in the cylinder $n'$ in the rear of pistons $p$ during the opening of the gates will expand and force said pistons forward and through the pitman connections rapidly close said gates. As will be appreciated, the distance which the projections $s'$ extend beyond the plane in which the studs $r$ revolve when the gates are in closed positions determines the period said gates will be arrested on each rotation of the valve, and thereby the areas of the ports $e^9$, which will be exposed. The gates thus regulate the area of said ports and are in turn controlled by the positions of the projections $s'$.

It is desirable that the positions of this controller should be automatically governed during the operation of the engine, and for accomplishing this purpose an ordinary centrifugal ball-governor is provided, having a connection coacting with the stem $t$ to shift the latter in one direction positively, and means are provided for exerting a constant tension to shift said stem in an opposite direction. The ball-governor is associated with a counter-shaft $u$, geared to the crank-shaft of the engine, and serves as one of the elements for transmitting the rotation of said crank-shaft to the valve-stem, as will be hereinafter described. This governor $v$ actuates a collar $w$, slidably mounted upon the shaft $u$, to which a laterally-extending bracket or arm is rigidly connected, the latter terminating in an angular extension $y$, running parallel to the valve-stem and guided in a rest $x$, projecting from the wall of the valve-casing $d$. The end of the arm $y$ is tapered upon its outer edge and coacts with a friction-roller secured to the end of the stem $t$, said roller being constantly held in contact with a tapered portion of the extension $y$ by a leaf-spring $z$, secured to a bracket 2, bolted to the valve-casing. This spring serves to exert a constant tension upon the stem $t$ to force the same inwardly. When the shaft $u$ is stationary, and consequently the balls of the governor in their extreme inward positions, the tapered end of arm $y$ also occupies its extreme inward position, which holds the stem $t$ in its extreme outward position, and consequently the extensions $r$ are projected the maximum distance across the path of lugs $s'$. The gates will consequently be open the maximum distance on the rotation of the valve, and the full areas of the ports $e^9$ will be exposed. As the speed of rotation of shaft $u$ gradually increases the governor will shift the collar $w$ and therethrough retract the arm $y$, and as the taper thereof decreases toward its end the stem will be forced inwardly by the spring $z$, and therethrough the projections $s'$ will be retracted and the period in which the gates are arrested diminished and as a consequence the areas of the exposed part of the ports $e^9$ decreased.

To regulate the tension of the spring $z$ and therethrough the resistance offered thereby to the movement of the arm $y$ under the influence of the ball-governor, a binding-screw 3 is provided, the stem of which passes through an opening in said spring and engages a threaded hole in the end of bracket 2, while the head of the screw finds a bearing upon the face of said spring.

In the operation of the valve it is desirable to obtain a quick passage of the admission-ports $e^9$ past the ports $c$ and a relatively slow passage of the exhaust-ports $e^{10}$ past the same in order that the live steam may be quickly cut off, while a relatively longer period is allowed for the exhaust. To this end in the present embodiment of my invention recourse is had to the gearing which transmits the rotation of the counter-shaft $u$ to the valve-stem. This gearing, as shown, comprises two intermeshing elliptical gear-wheels, so arranged relatively to each other and to the valve-stem and shaft $u$ that the action of the valve before premised will result.

It will be noted that the valve hereinbefore described is adapted to rotate in but one direction, while it is desirable that the rotation of the drive or crank shaft of the engine shall be capable of reversal, and as the valve is rotated through the medium of gearing interposed between the same and the crank-shaft this gearing must be of a character to transmit a continuous rotary movement in but one direction to the valve-stem from the crank-shaft irrespective of the direction of rotation of the latter. For this purpose a sleeve 4 is provided, which is keyed to the crank-shaft and carries a beveled gear 5 at each end thereof, either of which is adapted to mesh with a corresponding gear 6, fastened upon the lower end of the counter-shaft $u$. A lever 7 is provided for shifting the sleeve 4, and thereby throwing either of the gears 5 into and out of mesh with the gear 6. If the crank-shaft is rotating in one direction and the gears 5 6 (shown in mesh in Fig. 1) are in driving relation, the shaft $u$ will be rotated in the same direction in which it will be turned when the other gear 5 and the gear 6 are thrown in and the crank-shaft rotated in a reversed direction.

As before premised, the present invention contemplates the provision of means for reversing the engine with which the type of valve before described is associated, and while such reversing action requires no extra movement of the valve when the engine is on a dead-center in addition to the ordinary rotation thereof at other periods in the rotation of the crank-shaft an independent rotation must be imparted to said valve. When the crank-shaft of the engine is on a dead-center, the piston-head occupies a position at one end of the cylinder and the admission-port in the valve-head associated with the port in that end of the cylinder is about to open. Consequently to reverse it is only necessary to start the crank-shaft in a direction opposite to that in which it has been running and to shift the sleeve 4, so that the ordinary rotation will be imparted to the valve. In any other position of the crank-shaft, however, the piston will occupy an intermediate or central position in its cylinder, and the admission-port in the valve-head, which has just discharged live steam to the rear thereof, will have passed its port $c$, while on the other side of the piston the exhaust-port in the other valve-head will be in communication with the port $c$, with which it is associated. Therefore to obtain a reverse action the exhaust-port of the valve-head which has just discharged live steam to the rear of the piston must be brought into register with its port $c$, so that said steam may be discharged, while the exhaust on the other side of the piston must be cut off and the admission-port opened, so that said piston will be forced in a reversed direction from that in which it has been traveling. For this purpose the valve is given an independent or auxiliary movement equal to one-half of a complete rotation, which will reverse the positions of the heads $e^3$ $e^4$—that is, reverse the positions of the ports thereof in relation to the ports $c$. The mechanism for giving this additional movement is intended to be actuated by a hand-lever, and, as before premised, the auxiliary movement of the valve is not desired when the engine is on a dead-center. This mechanism includes self-locking means for preventing the auxiliary movement when the lever is shifted if the engine parts are in the position stated.

The preferred embodiment of the reversing mechanism as disclosed in Figs. 5, 6, and 7 includes means for securing the auxiliary rotation of the valve automatically, which is accomplished through the employment of steam taken from the valve-casing, thus requiring the application of manual power merely to start the said mechanism. As illustrated in Fig. 5, the valve-stem is made in two sections detachably coupled together, so that one of said sections may be rotated independently of the other when the same are uncoupled. The lower section 7 is geared to the counter-shaft $u$, while the upper section 8 carries the valve. Both sections are provided with central bores, and the upper section 8 is provided with an axial nipple 9, which fits into the end of the bore of section 7 and rests upon an annular shoulder formed by a ring or flange 10 therein. The inner walls of this nipple and flange are provided with oppositely-arranged registering grooves 12, into which a coupling-key 13 fits for locking the sections together. This key is carried upon the lower end of a stem depending axially from the closed bottom of a cup 14, which performs the office of a valve, said cup being slidably mounted in the bore of the section 8. Secured to this cup and extending through diametrically opposed radial slots in the wall of the section 8 are arms 13, having their ends interlocked with a collar 15, loosely mounted on said section. This collar is shifted to raise and lower the cup 14 for a purpose to be described by means of an arm 15', having one end thereof forked and provided with pins to engage said collar and having its opposite end secured fast upon a shaft 16, journaled in a suitable supporting-bracket 17. On this shaft an arm 18 is rigidly mounted, which is provided with an annularly-extending slotted or forked end 18', which receives the end of the spring-blade 19, carried by the hub of a lever 20, which is loosely mounted at one end upon said shaft 16 and is provided at its other end with a link connection running to a hand-operated shift-lever 20'. Secured to the arms 13 is a sleeve 21, loosely mounted upon the section 8 and provided at its upper end with oppositely-arranged outwardly-extending lugs 22, which when the collar 15 is at the limit of its upward movement rest in a higher plane than corresponding lugs 23, depending from the valve-casing, which interlock therewith in certain positions of the parts.

When the engine is on a dead-center, the lugs 22 23 are in alinement with one another, the former resting upon the upper faces of the latter or directly above the same. If with the parts in this position the hand-reversing lever is tilted, it will through the link 22 tilt the lever 20, which through the blade 19 will tend to tilt arm 18 and therethrough rock the shaft 16 and through arm 15' depress the cup-shaped valve 14; but as the lugs 22 and 23 are interlocked the collar 15 is held against depression and the arms 15' and 18 and the shaft 16 held against movement. Consequently the movement of arm 20 merely flexes the blade 19, which is made yielding for this purpose. If the crank-shaft of the engine is in any other position than on a dead-center, the lugs 22 23 will be out of alinement and the collar 15 free to move. Therefore when the arm 20 is tilted it will rock the shaft 16 and through arm 18 and blade 19, which is of sufficient rigidity for the purpose, depress the arm 15' and therethrough the collar 15 and valve 14. When the latter is depressed, it will carry the locking-key below the edge of the nipple 9, and consequently uncouple the sections 7 8 of the shaft, so that they can have relative independent rotary movement.

The end of the section 8 is provided with an enlarged end or piston-head 24, which is inclosed within a cylinder 25, loosely mounted upon the sectional shaft and supported upon friction-bearings interposed between the ends thereof and said piston-head. To the base of this cylinder a head 26 is bolted, providing a chamber in which suitable ratchet-gearing is located. This gearing is interposed between said head and the section 7 to prevent the rotation of said cylinder in one direction independently of the latter, but which permits of an independent rotary movement of the cylinder in a reverse direction. Ratchet-disks 27 28 are also placed above the cylinder, the latter being connected thereto and the former being pressed into engagement by a spring 27'. From the piston-head 24 a radial wing 24' extends, provided with a suitable pocket in the end thereof for the reception of a packing to form a steam-tight bearing between said end and the inner wall of the cylinder 25. From said wall two diametrically-arranged radial abutments project which coact with said wing. The main abutment 28 has a packing in the end thereof which bears against the piston-head, and the side thereof adjacent to the wing 24' is cut away to provide a chamber between the same and said wing when the latter is arrested thereby. The other abutment 29 only partly spans the space between the wall of the cylinder and the periphery of the head 24. Leading radially through the head 24 from the bore thereof to the periphery of the stem and directly adjacent to the rear end of the wing 24' is a port 30, forming an open communication between the chamber in said cylinder, formed between the abutment 28 and the wing 24', and the bore of the stem below the normal position of the valve 14. The bore of the stem above the bottom of the latter and the interior of the same is in open communication with the valve-chamber, and in the wall of said valve, near the base thereof, an opening 31 is provided, designed to register with the port 30 when the cup is depressed. Thus when the reversing-lever 20' is operated as before described and through the medium of the interposed mechanism the cup 14 depressed and the locking-key moved out of interlocking position said opening 31 is brought into register with the port 30. The steam then at once passes through said port from above the bottom of the cup and entering between the abutment 28 and the wing 24' forces the wing around and with it section 8, as the cylinder is prevented from rotating by the ratchet mechanism described. When the section has made one-half of a complete revolution, the wing 24' strikes against the abutment 29 and the further independent movement of the section 8 is prevented. The hand-lever 20' is then returned to position, and through the interposed mechanism the cup 14 is lifted until its bottom clears the port 30, when the steam in the cylinder 25 at once discharges therethrough and passing through the bore of the stem exhausts through radial opening 32 in the section 7. As soon as a vent is provided for the steam the air which has been compressed the wall 28' of the abutment 28 and the rear wall of wing 24', by the relative turning of the cylinder and head 24, tends to return the parts to their starting positions. As the two sections are now coupled together, and consequently a reverse movement of the piston-head 24 and section 7 prevented, the cylinder 25 is forced around until it is arrested by the wing 24' striking the abutment 28. The latter rotation of the cylinder is permitted by the ratchet mechanism located in the chamber formed by the head 26 and the ratchet mechanism above the cylinder.

Instead of employing the steam-operating mechanism described for reversing the valve manually-operating mechanism may be employed. Such mechanism is illustrated in Figs. 9, 10, and 11 of the accompanying drawings. This manually-operated mechanism embodies all of the fundamental principles of the steam-operating mechanism—that is, the valve-stem or a supplemental shaft geared thereto is composed of two sections detachably coupled together, and means are interposed between this sectional member and a hand-shift lever for preventing the coupling of said sections when the engine parts are in certain relation—i. e., when the crank-shaft is on a dead-center—and for giving the valve-section an independent or auxiliary rotary movement at other times. In the figures referred to the sectional shaft is indicated at 31, each section thereof having an externally-threaded hub upon its abutting end. Upon said abutting ends a sleeve 32 is threaded, which is provided at its lower end with a spur or gear wheel adapted to mesh with a segmental rack 33, carried by a pivotally-supported plate 34, operated by the reversing-lever through interposed mechanism. This interposed mechanism is such that the plate will not be tilted when the lever is rocked if the engine is on a dead-center. The lower end of the upper section of the shaft 31 is provided with a pocket in which a locking-key is located, the lower end of which engages with a transverse slot in the end of the lower section of shaft 31. The upper face of this end is provided with cam-surfaces for lifting the key out of the slot when the same is slightly raised and the upper section given a slight independent rotary movement. The key is held depressed by a leaf-spring interposed between the wall of the pocket and the end thereof. A flange or collar 38 is provided on the upper section, near the lower end of the same.

In operation as the reversing-lever is tilted the plate 33 will be carried forward, and the rack thereon, meshing with the gear 40, will rotate said sleeve 32 and feed the same upwardly until the top thereof strikes against outwardly-projecting lugs on the key and slightly raises the latter. The continued lifting of the sleeve is arrested by the collar 35, and as said sleeve can no longer feed upwardly the rotary movement thereof will be imparted to the upper section of the shaft. When a full half-revolution has been completed, the end of the key which has been lifted during the turning movement of the upper section by the cam-surfaces will reëngage the slots 36, whereupon by a reverse movement of the hand-operated lever the sleeve 32 will be returned to its starting position.

As before premised, the type of valve which has been presented hereinbefore must be driven at all times in the same direction, and consequently the sleeve 4 and double-beveled gears associated therewith must be provided to give this constant movement to the valve irrespective of the direction of rotation of the crank-shaft. In the modification illustrated in Fig. 8 a type of valve is disclosed embodying the invention presented in the preferred form of valve, but which is in addition so constructed that it is adapted to be reversed. In the modified valve the peripheries of both the admission and exhaust sides of the heads thereof are provided with a plurality of ports equidistantly spaced, and a gate is provided in each side to control said ports. Each gate is provided with a plurality of openings corresponding to those in the heads and adapted to register with the same and with solid or intact portions to also aline with the openings in the heads to close the latter. Each gate is hung centrally, so as to open in either direction, and the lug associated therewith, to be engaged by the controller, is centrally arranged. The gates are held in central or closed positions either by the employment of the cylinder-and-piston mechanisms before described or by properly adjusted springs 38.

To provide for the relative fast and slow movements of the valve at different periods or in the different positions assumed thereby in its rotation, a modification of the elliptical gearing before described may be employed. Such a modification is shown in Figs. 14 and 15, in which the valve-stem or a counter-shaft geared thereto is shown as provided with a mutilated gear 39 and a hub 40, having a peripheral mutilated gear, the teeth of which are in radial line with the mutilated part of said gear 39. The shaft for driving the stem is provided with a similar gear 42 and hub 43. The gear 39 is intended to mesh with gear 43 and the gear on hub 40 with the gear 43, and thus when the former pair are in mesh the valve will be driven at a relatively slow speed; but when the latter pair are in mesh a relatively faster speed will be imparted thereto.

I claim—

1. The combination with a steam-engine of a rotary valve including a hollow head having a steam-port therein, and a gate pivoted within said head for regulating the area thereof, substantially as described.

2. The combination with an engine of a rotary valve including a head having an admission-port in the periphery thereof, a gate for regulating the area of said port and tension means for closing and maintaining said gate in closed position, substantially as described.

3. The combination with an engine of a rotary valve including a head having a port in the periphery thereof, a pivoted gate associated therewith for controlling the same, a cylinder and piston, said cylinder having a port therein in communication with the steam-space of said valve, and a pitman connection between said piston and said gate, substantially as described.

4. The combination with an engine of a rotary valve including a head having a port in the periphery thereof, a pivoted gate associated therewith for controlling the same, a cylinder and piston, said cylinder having a port therein in communication with the steam-space of said valve, and a flexible pitman connection between said piston and said gate, substantially as described.

5. The combination with a steam-engine and a cylinder having a steam-port, of a rotary valve including a head associated with said port, said head having an admission-port in the periphery thereof, a gate for regulating the latter port, a valve-casing, a rest extending from one wall thereof, a controller for the gate supported upon said rest and a stem extending therefrom and projecting through the opposite wall of the valve-casing whereby the controller may be manipulated, substantially as described.

6. The combination with a steam-engine having a cylinder with a port leading into each end of the same, of a rotary valve having a head associated with each port, a port in each of said heads, a gate associated with each of the latter ports, and a single controller common to both of said gates, substantially as described.

7. The combination with a steam-engine having a cylinder with a port leading into each end of the same, of a rotary valve having a head associated with each port, a port in each of said heads, a gate associated with each of the latter ports, and a controller common to both of said gates, said controller being located between said heads, substantially as described.

8. The combination with a steam-engine having a cylinder with a port leading thereinto, of a rotary valve including a head associated with said port, said head having a port in the periphery thereof, a gate for regulating the latter port, a controller for said gate, an operating-stem extending therefrom, and a governor associated with said stem, substantially as described.

9. The combination with a steam-engine having a cylinder with a port leading thereinto, of a rotary valve including a head associated with said port, said head having a port in the periphery thereof, a gate for regulating the latter port, a controller for said gate, an operating-stem extending therefrom, a sliding bar having an inclined face coacting with the end of said stem, and a centrifugal ball-governor for shifting said bar, substantially as described.

10. The combination with an engine having a cylinder with a steam-port leading thereinto, of a rotary valve including a head associated with said port, said head having a port in the periphery thereof, a gate for regulating the same, a controller for said gate provided with an operating-stem, a friction-roller secured to the end of said stem, a sliding bar having an inclined face coacting with said roller, and centrifugal-ball-governor mechanism for shifting said bar, substantially as described.

11. The combination with an engine having a cylinder with a steam-port leading thereinto, of a rotary valve including a head associated with said port, said head having a port in the periphery thereof, a gate for regulating the same, a controller for said gate provided with a spring for pressing said stem in one direction, a sliding bar having inclined face adapted to press said stem in an opposite direction, and centrifugal-ball-governor mechanism for shifting said stem, substantially as described.

12. The combination with an engine having a cylinder provided with a steam-port, of a rotary valve including a head associated with said port, said head having a port in the periphery thereof, a gate for regulating the same, a controller for said gate having an operating-stem-governor mechanism adapted to press said stem in one direction, and an adjustable, yielding device coacting with the stem to exert a tension thereon to press the same in an opposite direction, substantially as described.

13. The combination with a steam-engine having a cylinder with a port leading thereinto, of a rotary valve including a head having a port therein, a gate regulating the same, a controller therefor, an operating-stem and governing mechanism for said controller comprising a sliding bar having an inclined face coacting with the end of said stem, centrifugal governing mechanism for shifting said bar, a leaf-spring also coacting with the end of said stem and means for adjusting the tension of said spring, substantially as described.

14. The combination with an engine having a cylinder provided with a steam-port, of a rotary valve including a head having a steam admission and an exhaust side, each of said sides having a port designed to register with the cylinder-port aforesaid, a crank-shaft, means for transmitting the rotation of the latter to the valve, said means including mechanism for rotating the valve at a relatively slow speed during one portion of its movement and a relatively faster speed during the remaining portion thereof, substantially as described.

15. The combination with an engine having a cylinder provided with a steam-port, of a rotary valve including a head having a steam admission and an exhaust side, each of said sides having a port designed to register with the cylinder-port aforesaid, a crank-shaft, means for transmitting the rotation of the latter to the valve, said means including an elliptical gearing forming a part of said transmission mechanism for rotating the said valve at a relatively slow speed during one portion of its movement and a relatively faster speed during the remaining portion thereof, substantially as described.

16. The combination with a steam-engine of a valve for controlling the admission and exhaust of steam to the cylinder thereof, a crank-shaft adapted to be reversed and means interposed between said shaft and valve for rotating the latter in the same direction irrespective of the direction of rotation of the former, substantially as described.

17. The combination with a steam-engine having a valve designed to rotate in but one direction and a crank-shaft adapted to have the direction of rotation thereof reversed, of means for transmitting the rotation movement of said shaft to the valve, including a shaft carrying a single beveled gear, and a pair of beveled gears associated with the crank-shaft, either of which is adapted to coact with said single gear, substantially as described.

18. The combination with a steam-engine having a rotary valve designed to rotate in but one direction and a crank-shaft adapted to be reversed, of means for transmitting the rotation of the latter to the former, including a shiftable sleeve, a beveled gear secured to each end thereof, a counter-shaft, a single gear carried thereby and means for shifting said sleeve to bring either of the gears thereof into mesh with the gear on the counter-shaft, substantially as described.

19. The combination with a steam-engine, having a steam-controlling valve adapted to be rotated in but one direction and a crank-shaft adapted to have the direction of rotation thereof reversed, of means for transmitting the rotation of said shaft to said valve and means for giving the valve an auxiliary rotary movement, substantially as described.

20. The combination with a steam-engine having a rotary valve and a reversible crank-shaft, of means for transmitting the rotation of said shaft to the valve including a sectional shaft, said valve rotating in unison with one of said sections, and means for giving said section an auxiliary movement, substantially as described.

21. In an engine the combination with a valve capable of rotation in but a single direction, and a crank-shaft, of means for transmitting the rotation of the former to the latter, including a sectional shaft, the said valve being rotated in unison with one section thereof, a shift-lever and means actuated thereby for giving said section an auxiliary movement, substantially as described.

22. In an engine the combination with a valve capable of rotation in but a single direction and a crank-shaft, of means for transmitting the rotary movement of the former to the latter, including the sectional shaft, said valve being rotated in unison with one section of said shaft, a shift-lever, means actuated thereby for giving said shaft an auxiliary movement and means controlled by the position of said valve for locking the latter movement against operation when said shift-lever is operated, substantially as described.

23. In an engine the combination with a valve capable of rotation in but a single direction and a crank-shaft adapted to be reversed, of means for transmitting the rotation of the latter to the former, including a sectional shaft and shift-lever, an automatically-operating mechanism actuated thereby for giving one section of said shaft an auxiliary movement, substantially as described.

24. In an engine the combination with a valve capable of rotation in but a single direction and a reversible crank-shaft, of means for transmitting the rotation of the latter to the former, including a sectional shaft, said valve rotating in unison with one section thereof, a shift-lever automatically-operating mechanism for giving said section an auxiliary movement, a controller for the latter, and means interposed between said shift-lever and controller for operating the latter when the lever is tilted, substantially as described.

25. In an engine the combination with a valve capable of rotation in but a single direction and a reversible crank-shaft, of means for transmitting the rotation of the latter to the former, including a sectional shaft, said valve rotating in unison with one section thereof, a shift-lever, automatically-operating mechanism for giving said section an auxiliary movement, a controller for the latter, and means interposed between said shift-lever and controller for operating the latter when the lever is tilted and means controlled by the valve for locking said controller to prevent the movement thereof in certain position of the valve, substantially as described.

26. In an engine in combination with a valve capable of rotation in but a single direction and a reversible crank-shaft, of means for rotating the former from the latter, including a sectional shaft, said valve moving in unison with one section thereof, and means for giving the said section an auxiliary rotation including a piston carried by said section, a cylinder associated with the same, steam inlet and exhaust ports and a valve for controlling the same, substantially as described.

27. In an engine in combination with a valve capable of rotation in but a single direction and a crank-shaft, of means for transmitting the rotation of the former to the latter, including a sectional shaft, said valve being rotated in unison with one section thereof, means for giving said section an auxiliary rotation, including a piston carried by said section, a cylinder associated with the same, steam inlet and exhaust ports, a controlling-valve therefor, a shift-lever and means operated thereby for controlling the latter valve, substantially as described.

28. In an engine the combination of a valve capable of rotation in but a single direction and a reversible crank-shaft, of means for transmitting the rotation of the latter to the former, including a sectional shaft, a key for coupling said sections together and means for shifting said key to uncouple said sections and for giving one of said sections an auxiliary rotary movement, substantially as described.

29. In an engine the combination with a valve capable of rotation in but a single direction and a reversible crank-shaft, of means for transmitting the rotation of the latter to the former, including a sectional shaft having registering slots in the abutting ends thereof, a key interlocking therewith for coupling said sections together and means for shifting said key to uncouple said sections and for giving one of the latter an auxiliary rotary movement, substantially as described.

30. In an engine the combination with a valve capable of rotation in but a single direction and a reversible crank-shaft, of means for transmitting the rotation of the latter to the former, including a sectional shaft having registering slots in the abutting ends thereof, a key interlocking therewith for coupling said sections together, and means for shifting said key axially of said shaft to uncouple said sections, and for giving one of the latter an auxiliary rotary movement, substantially as described.

31. In an engine the combination with a valve capable of rotation in but a single direction and a reversible crank-shaft, of means for transmitting the rotation of the former to the latter, including a sectional shaft, a key for coupling said sections together, a piston carried by one section of said shaft, a cylinder associated with the same, a steam-port leading to the chamber in said cylinder, a valve for controlling the same, means for shifting said valve and means interposed between said valve and said key for shifting the latter in unison with said valve, substantially as described.

32. In an engine the combination with a valve capable of rotation in but a single direction and a reversible crank-shaft, of means for transmitting the rotation of the former to the latter, including a sectional shaft, a key for coupling said sections together, steam-actuated mechanism for giving one section of said shaft an auxiliary rotary movement, a shiftable valve for controlling said steam-actuating mechanism, and manually-actuated means for shifting said valve, substantially as described.

33. In an engine the combination with a valve capable of rotation in but a single direction and a reversible crank-shaft, of means for transmitting the rotation of the former to the latter, including a sectional shaft, a key for coupling said sections together, steam-actuated mechanism for giving one section of said shaft an auxiliary rotary movement, a shiftable valve for controlling said steam-actuating mechanism, a manually-actuated means for shifting said valve, and a stem depending from said valve carrying said key, substantially as described.

34. In an engine the combination with a valve capable of rotation in but a single direction and a crank-shaft adapted to have the direction of rotation thereof reversed, of means for rotating the former from the latter, including a sectional shaft, a piston-head carried by the abutting end of the upper of said sections, said section having an axial bore in communication with the steam in the valve-casing, a cylinder inclosing the piston-head loosely mounted upon the sectional shaft, means for locking the same to the lower section of said shaft against movement in one direction independently thereof, said piston-head having a radial port leading from the bore thereof into the chamber of the cylinder, a valve for controlling said port located in the bore of the first section, and manually-operating mechanism for shifting said valve.

35. In an engine the combination with a valve capable of rotation in but a single direction and a crank-shaft adapted to be reversed, of means for rotating the former from the latter, including a sectional shaft, a piston-head carried by the abutting end of the upper of said sections, the latter section having an axial bore in communication with the steam in the valve-casing, a radial wing carried by said head, a cylinder loosely inclosing the latter, having diametrically-arranged abutments, one of said abutments bearing upon the piston-head, a port leading through said head opening into the cylinder-chamber between the last-named abutment and said wing, a cup-shaped valve having a port in the side wall thereof mounted in the bore of the first section, said valve normally resting in a higher plane than the port in the piston-head whereby the same is exposed, the lower section of said shaft having a bore provided with a discharge-port leading therefrom and manually-operating means for shifting the valve.

36. In an engine the combination with a valve capable of rotation in but a single direction and a crank-shaft adapted to be reversed, of means for rotating the former from the latter, including a sectional shaft, a piston-head carried by the abutting end of the upper of said sections, the latter section having an axial bore in communication with the steam in the valve-casing, a radial wing carried by said head, a cylinder loosely inclosing the latter having diametrically-arranged abutments, one of said abutments bearing upon the piston-head, a port leading through said head opening into the cylinder-chamber between the last-named abutment and said wing, a cup-shaped valve having a port in the side wall thereof mounted in the bore of the first section, said valve normally resting in a higher plane than the port in the piston-head whereby the same is exposed, the lower section of said shaft having a bore provided with a discharge-port leading therefrom, manually-operating means for shifting the valve and means for locking the valve against movement.

37. In combination in an engine with a valve capable of rotation in but a single direction, a casing therefor and a reversible crank-shaft, of means for rotating the valve from the latter, including a sectional shaft comprising an upper and a lower section, each having an axial bore, that in the upper shaft being in open communication with the interior of the valve-casing, a piston-head on the end of the upper section having a radial wing and an axial nipple depending therefrom fitting within the bore of the lower section, a coupling-key associated therewith and the lower section, a cylinder inclosing the piston-head loosely mounted on said shaft and having radially-opposed abutments coacting with said wing, said piston-head having a steam-port leading from the bore thereof to the cylinder-chamber, a controlling-valve located in the bore of the upper section, means for operating the same, including a shift-lever, and ratchet mechanism interposed between said cylinder and the sectional shaft.

PETER BERKELEY BELCHES.

Witnesses:
ALEXANDER S. STEWART,
THOMAS DURANT.